US 9,417,824 B2
(45) Date of Patent: Aug. 16, 2016

(12) United States Patent
Watanabe

(10) Patent No.: US 9,417,824 B2

(54) DISPLAY CONTROLLING APPARATUS, IMAGE FORMING APPARATUS, METHOD, PROGRAM AND STORAGE MEDIUM

(75) Inventor: Genki Watanabe, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 340 days.

(21) Appl. No.: 13/605,588

(22) Filed: Sep. 6, 2012

(65) Prior Publication Data
US 2013/0070298 A1 Mar. 21, 2013

(30) Foreign Application Priority Data

Sep. 15, 2011 (JP) ................................. 2011-202065

(51) Int. Cl.
| G06F 3/12 | (2006.01) |
| G06K 15/00 | (2006.01) |
| H04N 15/00 | (2006.01) |
| H04N 1/40 | (2006.01) |
| G06F 9/44 | (2006.01) |

(52) U.S. Cl.
CPC ............ *G06F 3/1203* (2013.01); *G06F 3/1259* (2013.01); *G06F 3/121* (2013.01); *G06F 9/4446* (2013.01)

(58) Field of Classification Search
CPC ..... G06F 3/1222; G06F 3/1238; G06F 21/31; G06F 21/608
USPC ........................................ 358/1.15, 1.13, 448
See application file for complete search history.

(56) References Cited

U.S. PATENT DOCUMENTS

| 5,794,228 A | * | 8/1998 | French | ............... G06F 17/30324 |
| 5,873,659 A | * | 2/1999 | Edwards | ..................... B41J 5/30 |
| | | | | 357/1.15 |
| 6,535,702 B1 | * | 3/2003 | Takatsu | .......................... 399/81 |
| 6,795,658 B2 | * | 9/2004 | Barrett | ............... G03G 15/5012 |
| | | | | 399/18 |
| 7,180,608 B1 | * | 2/2007 | Yu | ......................... G06F 3/1204 |
| | | | | 358/1.1 |

(Continued)

FOREIGN PATENT DOCUMENTS

| CN | 101093506 A | 12/2007 |
| CN | 101151597 A | 3/2008 |

(Continued)

OTHER PUBLICATIONS

Chinese Office Action mailed Jul. 24, 2014.

*Primary Examiner* — Akwasi M Sarpong
(74) *Attorney, Agent, or Firm* — Harness, Dickey & Pierce, P.L.C.

(57) ABSTRACT

If the adding command accepting unit accepts command to add error guidance from the job controlling unit, the item adding unit adds data for the error guidance to display item list in the display item list storing unit. If it is necessary to display the error guidance in screen currently displayed, the page data generating unit adds data for the error guidance to page data of screen currently displayed. If items of reserved jobs and scanning guidance related to the reserved jobs do not fit in the page by the addition, the page data generating unit removes data for those items from the page data for screen currently displayed, and stores the removed data as items laid out in the next page. The display controlling unit displays the job list screen on the control panel based on the page data.

18 Claims, 10 Drawing Sheets

(56) References Cited

U.S. PATENT DOCUMENTS

| | | | |
|---|---|---|---|
| 7,190,477 B2* | 3/2007 | Ferlitsch | 358/1.15 |
| 8,040,537 B2* | 10/2011 | Smith | H04N 1/00238 358/1.13 |
| 8,437,651 B2* | 5/2013 | Kamata | 399/81 |
| 2002/0040375 A1* | 4/2002 | Simon | G06T 11/60 715/251 |
| 2002/0114024 A1* | 8/2002 | Chiu | H04N 1/00241 358/505 |
| 2002/0135792 A1* | 9/2002 | Sommer et al. | 358/1.13 |
| 2002/0171868 A1* | 11/2002 | Yoshimura et al. | 358/1.15 |
| 2003/0160993 A1* | 8/2003 | Kang | 358/1.15 |
| 2004/0156069 A1* | 8/2004 | Kurotsu | G06F 3/121 358/1.13 |
| 2004/0174563 A1* | 9/2004 | Cassidy, Jr. | H04N 1/3873 358/1.18 |
| 2004/0194033 A1* | 9/2004 | Holzwarth | G06F 17/211 715/274 |
| 2005/0024681 A1* | 2/2005 | Tehrani | H04N 1/3875 358/1.18 |
| 2005/0036170 A1* | 2/2005 | Okuoka | H04N 1/00957 358/1.16 |
| 2005/0141007 A1* | 6/2005 | Shirai et al. | 358/1.13 |
| 2006/0271936 A1* | 11/2006 | Matsuda et al. | 718/102 |
| 2007/0088871 A1* | 4/2007 | Kwong et al. | 710/39 |
| 2007/0177180 A1* | 8/2007 | Yamada et al. | 358/1.13 |
| 2008/0016090 A1 | 1/2008 | Fukata | |
| 2008/0109676 A1* | 5/2008 | Hama | G06F 11/1435 714/6.12 |
| 2008/0168450 A1* | 7/2008 | Tarumi | G06Q 10/00 718/102 |
| 2008/0225327 A1* | 9/2008 | Smith | G06F 3/1288 358/1.15 |
| 2009/0033990 A1* | 2/2009 | Matsugashita | G06F 21/608 358/1.15 |
| 2009/0142037 A1 | 6/2009 | Mikawa | |
| 2010/0182501 A1* | 7/2010 | Sato | G06T 11/60 348/441 |
| 2010/0214619 A1* | 8/2010 | Sudo | H04N 1/3875 358/3.24 |
| 2011/0029921 A1* | 2/2011 | Terada | G06F 3/04886 715/810 |
| 2011/0052242 A1* | 3/2011 | Kamata | 399/82 |
| 2011/0161806 A1* | 6/2011 | Stern | G06F 17/211 715/247 |
| 2011/0164283 A1* | 7/2011 | Sadasue | G06F 3/1204 358/1.16 |
| 2011/0222870 A1* | 9/2011 | Miyagi | G03G 15/5041 399/15 |
| 2012/0141023 A1* | 6/2012 | Wang | H04N 1/00148 382/162 |
| 2012/0236176 A1* | 9/2012 | Kita | H04N 1/32144 348/231.2 |
| 2012/0243036 A1* | 9/2012 | Aoki | G06F 3/1207 358/1.15 |
| 2012/0324344 A1* | 12/2012 | Sakurai | G06T 11/60 715/251 |
| 2014/0009792 A1* | 1/2014 | Kanamori | 358/1.15 |

FOREIGN PATENT DOCUMENTS

| | | |
|---|---|---|
| CN | 101946229 A | 1/2011 |
| JP | 2001-144892 | 5/2001 |
| JP | 2002-027179 | 1/2002 |
| JP | 2002-225389 | 8/2002 |

* cited by examiner

DISPLAY CONTROLLING APPARATUS, IMAGE FORMING APPARATUS, METHOD, PROGRAM AND STORAGE MEDIUM

CROSS-REFERENCE TO RELATED APPLICATION

This patent application is based on and claims priority pursuant to 35 U.S.C. §119 to Japanese Patent Application No. 2011-202065, filed on Sep. 15, 2011, the entire disclosure of which is hereby incorporated by reference herein.

BACKGROUND OF THE INVENTION

1. Field of the Invention

The present invention relates to a display controlling apparatus, an image forming apparatus including a facsimile, a printer, a copier and a multifunctional peripheral, a display controlling method, program, and storage medium that stores the program to implement the display controlling process.

2. Description of the Related Art

Many image forming apparatuses such as facsimile machines, printers, copiers, and multifunctional peripherals that include functions of apparatuses described above can reserve execution of other jobs while processing a job. In some cases, a user wants to know how many and what kind of jobs are reserved on an image forming apparatus or executing status of each job.

Conventionally, in case of reserving a plurality of jobs and processing sequentially, an apparatus that displays a list of reserved jobs and status of each reserved job to a user has been proposed (e.g., JP-2002-27179-A). Also, an image forming apparatus that displays reserved print jobs stored in a storage medium in different format between executable jobs and infeasible jobs so that a user can identify them (e.g., JP-2002-225389-A) has been proposed.

However, the conventional apparatuses described above cannot display inserting new items that allow a user to choose only when events such as errors occur. Also, sometimes it is hard for a user to distinguish items since the apparatus displays related items on different pages in listing jobs. Those job listing displays are not easy for a user to refer to.

BRIEF SUMMARY OF THE INVENTION

The present invention provides a novel display controlling apparatus, image forming apparatus, method, program, and storage medium that facilitates easiness to recognize display listing a plurality of items to which a user refers.

More specifically, the present invention provides a display controlling apparatus that includes a storing unit that stores display item list to be displayed on a displaying unit, a page data generating unit that generates page data that specifies predefined numbers of items listed on a page and their layout order, a display controlling unit that displays a page on the displaying unit based on the page data generated by the page data generating unit, an additional request receiving unit that receives additional request on items that should be displayed on the displaying unit, and an item adding unit that adds items received by the additional request receiving unit into a display item list. If the page data generating unit determines that it is necessary to display the requested additional item on the page currently displayed, the display controlling apparatus also includes a controller that updates the page data currently displayed by adding data that indicates the added items to the page data of which currently displayed, deleting items that do not fit in the page by the addition from the page data and storing the item laid out on the next page, and deleting item already related to the deleted item and storing the item laid out on the next page in case there is an item already related to the deleted item.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION OF THE PREFERRED EMBODIMENTS

Figure 1:
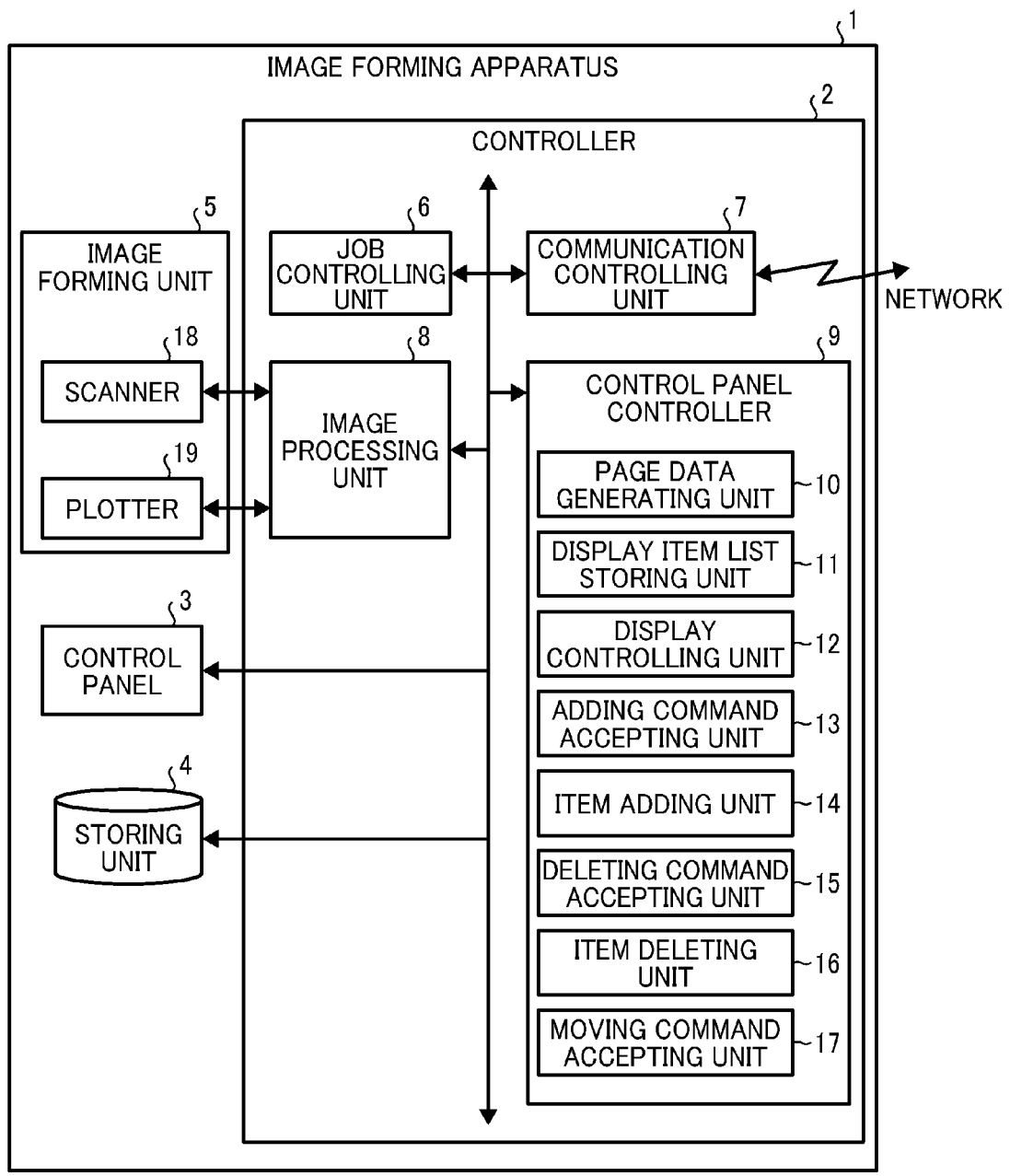
FIG. 1 is a diagram illustrating a functional configuration of an image forming apparatus as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

An embodiment of the present invention will be described in detail below with reference to the drawings. FIG. 1 is a diagram illustrating a functional configuration of an image forming apparatus 1 as an embodiment of the present invention. In the present embodiment the image forming apparatus 1 is a multifunctional peripheral that includes facsimile communicating function via communicating network (including data communication by using internet), scanning function to scan image of document optically (scanner), printing function to print on media such as paper based on the image data (printer), and copying function to scan an image of a document and print the image on media (copier).

The image forming apparatus 1 includes a controller 2, a control panel 3, a storing unit 4, and image forming unit 5. The control panel 3 includes a displaying unit that displays a screen and displays various screens on the displaying unit. Also, the control panel 3 includes a touch panel equivalent to an operating unit on the displaying unit, and accepts commands input by keys corresponding to pushed positions on the touch panel.

The storing unit 4 is a storage device including hard disk drives, and stores various data including job data executed on the image forming apparatus 1. There are jobs such as facsimile sending (or data sending) image data scanned by a scanner 18 to designated destination, printing data received from external devices via network, and copying jobs that print image data scanned by the scanner 18 using a plotter 19.

There is also a reserved job executed when predefined conditions (predefined date and time, etc.) are satisfied and wait for the conditions until then. Some of the reserved jobs start executing when the currently executing job finishes.

The image forming unit 5 includes the scanner 18 that scans a document image and inputs the scanned image data and the plotter 19 that executes various printing such as printing based on the image data scanned by the scanner 18 and printing image data received via network.

The controller 2 is implemented by a microcomputer that includes CPU, ROM, and RAM, and executing programs (firmware) stored in ROM and using RAM as a working area for the CPU. The controller 2 includes a job controlling unit 6, a communication controlling unit 7, image processing unit 8, and an control panel controller 9. Also the controller 2 exerts overall control of the image forming apparatus 1.

The job controlling unit 6 executes data communicating job, image scanning job, printing job, and copying job based on job data stored in the storing unit 4. The job data described above includes data to be processed or image data. Also, the job controlling unit 6 executes reserved job when predefined conditions are satisfied. Lastly, the job controlling unit 6 sends commands to display various information on executing jobs to the control panel controller 9.

The communication controlling unit 7 controls facsimile communication (facsimile sending and receiving), network communication, and internet communication via network including telephone network, communicating network, and internet.

The image processing unit 8 executes predefined image processes such as analog-digital conversion, offset correction, and shading correction on image data scanned by executing an image scanning job (including a reserved job) by the scanner 18. The image processing unit 8 also executes image processing that forms image data to be printed by the plotter 19 executing a printing job (including a reserved job).

The control panel controller 9 controls input from the control panel 3 and output to the control panel 3, and includes a page data generating unit 10, display controlling unit 12, adding command accepting unit 13, item adding unit 14, deleting command accepting unit 15, item deleting unit 16, and moving command accepting unit 17 as functional units implemented by executing steps included in programs executed by the CPU.

The control panel controller 9 also executes a storing process to store display item list in the display item list storing unit 11. The display item list storing unit 11 stores display item list to be displayed by the displaying unit of the control panel 3, and a part of RAM in the controller 2 can be allocated to implement the display item list storing unit 11. An example of a display item list is a reserved job list to be displayed on job list screen such as data sending, image scanning, printing, and copying on the image forming apparatus 1.

As for display item list of a job list screen, the control panel controller 9 generates a display item list that includes items that should always be displayed in the job list screen (e.g. title key) and key of each reserved job acquired from reserved job list managed by the job controlling unit 6, and stores the display item list in the display item list storing unit 11.

The display controlling unit 12 controls displaying a screen including a job list screen on the displaying unit of the control panel 3 based on page data generated by the page data generating unit 10.

The adding command accepting unit 13 controls accepting command to add items that should be displayed on the displaying unit of the control panel 3 from the job controlling unit 6. For example, in case of occurring an error during displaying a job list screen, if the job controlling unit 6 sends command to add error guidance that displays detail of the error, instruction to resolve the error, and instruction to cope with the error in the job list screen, the adding command accepting 13 accepts the command as command to add error guidance in the job list screen.

If the adding command accepting unit 13 accepts command to add item from the job controlling unit 6, the item adding unit 14 controls adding the item data to the display item list in the display item list storing unit 11. For example, if the adding command accepting unit 13 accepts command to add error guidance to the job list screen from the job controlling unit 6, the item adding unit 14 adds data of error guidance to the display item list in the job list screen.

The deleting command accepting unit 15 controls accepting command to delete items that should be displayed on the displaying unit of the control panel 3 from the job controlling unit 6. For example, in case of resolving an error during displaying error guidance in a job list screen, if the job controlling unit 6 sends command to delete error guidance from the job list screen, the deleting command accepting 15 accepts the command as command to delete the error guidance from the job list screen.

If the deleting command accepting unit 15 accepts command to delete item from the job controlling unit 6, the item deleting unit 16 controls deleting the item data from the display item list in the display item list storing unit 11. For example, if the deleting command accepting unit 15 accepts command to delete error guidance from the job list screen from the job controlling unit 6, the item deleting unit 16 deletes data of error guidance from the display item list in the job list screen.

The moving command accepting unit 17 controls accepting command to move on to previous page from operation panel of the control panel 3 in response to a user operation. An example of command to move on to previous page is command to move on to previous page during displaying a job list screen.

The page data generating unit 10 controls generating page data that prescribes predefined number of items laid out in a page of a screen and their layout order.

An example of the page data is page data of a job list screen. Page data of a job list screen includes whole layout data of the job list screen and data that prescribes number of data layout in a page and layout order of items registered in display item list of the job list screen in a page.

After adding item to display item list in the display item list storing unit 11, if the page data generating unit 10 determines that it is necessary to display the added item in the screen currently displayed, the page data generating unit 10 executes a first controlling process that updates page data of screen currently displayed by adding data that indicates the added item to the page data of screen currently displayed, deleting the item that does not fit into the page by the addition from the page data and storing the item as item to be laid out in the next page, and deleting item that previously related to the deleted item from the page data of the screen and storing the item as item to be laid out in the next page. An example of the first controlling process is controlling adding error guidance to display item list on job list screen.

Also, after deleting item from display item list in the display item list storing unit 11, if the page data generating unit 10 determines that it is necessary to delete the deleted item from the screen currently displayed, the page data generating unit 10 executes a second controlling process that updates page data of screen currently displayed by deleting data that indicates the deleted item from the page data of screen currently displayed, and moving up front items laid out behind the deleted item in screen currently displayed. An example of the second controlling process is controlling deleting error guidance from display item list on job list screen.

Furthermore, after deleting item from display item list in the display item list storing unit 11, if the page data generating unit 10 determines that it is necessary to delete the deleted item from the screen currently displayed, the page data generating unit 10 can execute a third controlling process that updates page data of screen currently displayed by deleting data that indicates the deleted item from the page data of screen currently displayed, and laying out items that should be laid out behind the deleted item filled to fit in one page with reference to the display item list in the display item list storing unit 11 instead of the second controlling process. An example of the third controlling process is controlling deleting error guidance from display item list on job list screen.

Either the second controlling process or the third controlling process can be pre-validated by user operation. A user can choose the setting by a user operation such as key input on the control panel 3.

Also, after updating the page data in response to deleting item from the display item list in the display item list storing unit 11, if the moving command accepting unit 17 accepts command to move on to the previous page, the page data generating unit 10 executes a fourth controlling process that generates page data for the previous page that lays out items laid out on the previous page in case items are laid out sequentially from the first page based on the display item list after deleting the item. An example of the fourth controlling process is controlling accepting command to move on to the previous page after deleting error guidance from the job list screen.

Furthermore, after updating the page data in response to deleting item from the display item list in the display item list storing unit 11, if the moving command accepting unit 17 accepts command to move on to the previous page, the page data generating unit 10 executes a fifth controlling process that generates page data for the previous page that lays out predefined number of items based on display item list after deleting item so that item adjacent to item displayed top on the screen currently displayed is laid out in the tail end of layout possible position. An example of the fifth controlling process is controlling accepting command to move on to the previous page after deleting error guidance from the job list screen.

Either the fourth controlling process or the fifth controlling process can be pre-validated by user operation. A user can choose the setting by a user operation such as key input on the control panel 3.

After scanning document and generating image data by the scanner 18 in the image generating unit 5, the image processing unit 8 executes predefined image processing on the image data, the storing unit 4 stores the image data temporarily, and the communication controlling unit 7 facsimile sends or data sends to designated destination device designated by a user operation on the control panel 3 on network under the control of the controller 2 in the image forming apparatus 1. Also, after scanning document and generating image data by the scanner 18 in the image generating unit 5, the image processing unit 8 executes predefined image processing on the image data, and the storing unit 4 stores the image data under the control of the controller 2 in the image forming apparatus 1.

Furthermore, after storing data received from a device on network by the communication controlling unit 7 in the storing unit 4 temporarily, the image processing unit 8 executes predefined image processing on the data, and the plotter 19 in the image forming unit 5 prints the data on a sheet of paper under the control of the controller 2 in the image forming apparatus 1. Also, after scanning document and generating image data by the scanner 18 in the image generating unit 5, the image processing unit 8 executes predefined image processing on the image data, the storing unit 4 stores the image data temporarily, and the plotter 19 outputs by printing the data on a sheet of paper under the control of the controller 2 in the image forming apparatus 1. The control panel controller 9 displays various screens on the control panel 3 at the time of executing various processes including communicating process, image scanning process, printing process, and copying process described above.

Next, screen displaying process in the image forming apparatus 1 is described below. For example, process that displays job list screen on the displaying unit in the control panel 3 is described. In this embodiment, in case of displaying reserved job list on job list screen processes that adds error guidance to job list screen, lays out reserved jobs that does not fit in the page by the addition, lays out reserved jobs and scanning guidance related with each other that does not fit in the page on the next page, and deletes error guidance from the job list screen are described. Also, page moving process during displaying job list screen is described.

Figure 2:
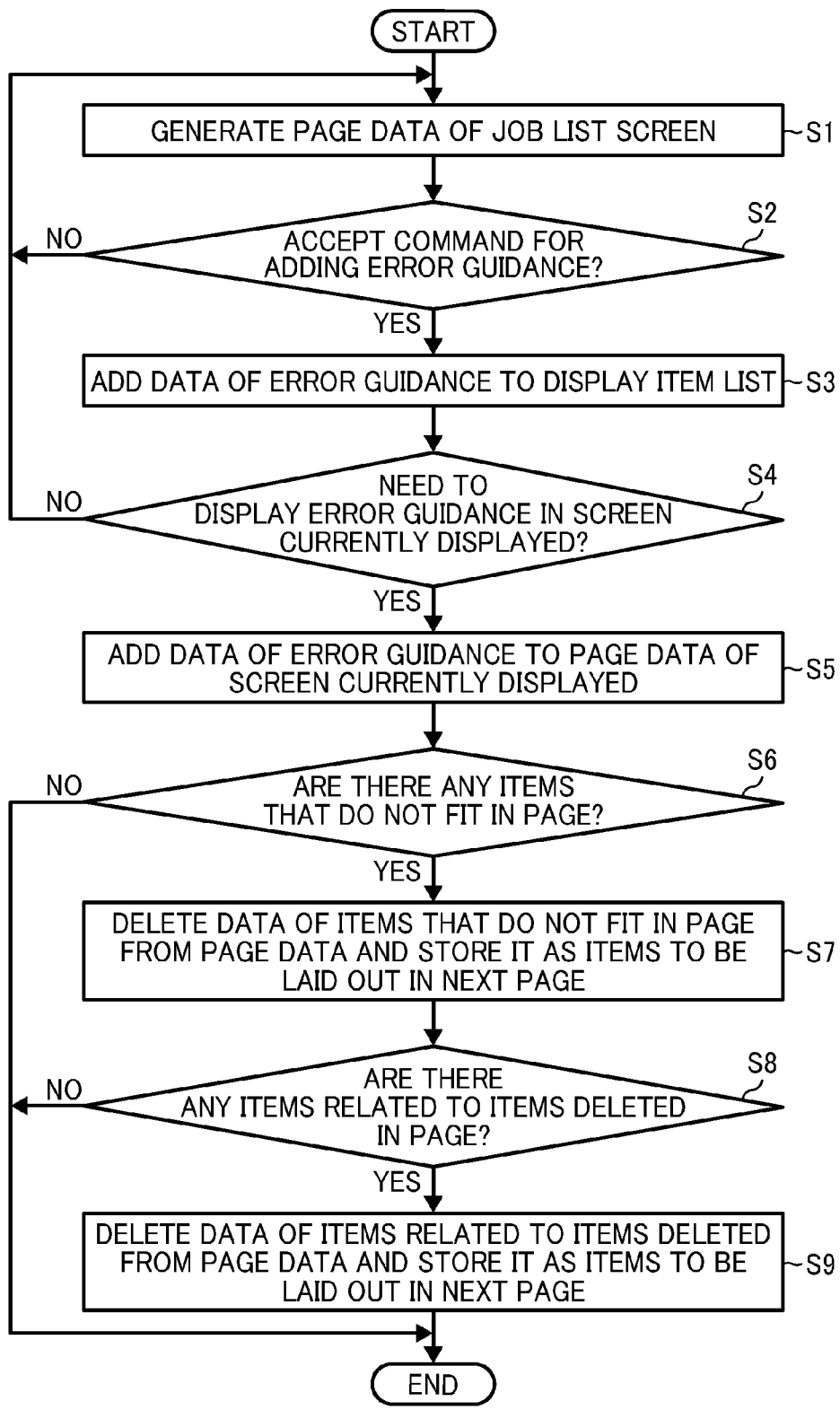
FIG. 2 is a flowchart illustrating an example of displaying a job list screen on an control panel and a display controlling process of displaying a job list at the time of an error occurring by an operation screen controlling unit in the image forming apparatus in FIG. 1 as an embodiment of the present invention.

FIG. 2 is a flowchart illustrating an example of displaying a job list screen on the control panel 3 and display controlling process of displaying job list screen at the time of an error occurring in the image forming apparatus 1 by the control panel controller 9 in FIG. 1. After accepting command to display a job list screen from operation panel of the control panel 3 by the control panel controller 9 in FIG. 1, the page data generating unit 10 in FIG. 1 generates page data of job list screen based on display item list for job list screen in the display item list storing unit 11 in S1 in FIG. 2, and the display controlling unit 12 displays the job list screen on displaying unit of the control panel 3 based on the page data, then the process proceeds to S2. This S1 corresponds to the page data generating step that generates page data for job list screen.

If it is determined that the adding command accepting unit 13 in FIG. 1 accepts command to add error guidance from the job controlling unit 6 (Y in S2), the process proceeds to S3. If not (N in S2), the process goes back to S1. This S2 corresponds to the adding command accepting step.

In S3, the item adding unit 14 in FIG. 1 adds data for error guidance to display item list of job list screen in the display item list storing unit 11, and the process proceeds to S4. This S3 corresponds to the item adding step.

In S4, if the page data generating unit 10 determines that it is necessary to display error guidance in screen currently displayed (on the displaying unit of the control panel 3) (Y in S4), the process proceeds to S5. If not (N in S4), the process goes back to S1. This S4 corresponds to a step to determine that it is necessary to display added item on screen currently displayed.

In S5, the page data generating unit 10 in FIG. 1 adds data for error guidance to page data of screen currently displayed (on the displaying unit of the control panel 3), and the process proceeds to S6. In this embodiment, layout order of error guidance in page data is predefined. This S5 corresponds to a step to add data that indicates added item to page data of screen currently displayed.

In S6, if it is determined that there are items of reserved jobs or scanning guidance that do not fit in a page by adding error guidance to the page by the page data generating unit 10 in FIG. 1 (Y in S6), the process proceeds to S7. If not (N in S6), this process is finished. This S6 corresponds to a step to determine whether or not there is item that does not fit in the page.

If the page data generating unit 10 in FIG. 1 determines that there is no item for reserved job or scanning guidance that does not fit in the page in the determining process described above, the page data generating unit 10 does not update the page data, so contents of job list screen currently displayed on the displaying unit of the control panel 3 by the display controlling unit 12 in FIG. 1 does not change even if error guidance is added. Also, in the determining process described above, the page data generating unit 10 determines Y if number of items that should be displayed in a page goes over predefined number by adding error guidance. If not, the page data generating unit 10 determines N.

In S7, the page data generating unit 10 removes data for items that do not fit in a page from the page data for screen currently displayed, and stores the removed data as items laid out in the next page inside the page data generating unit 10, then the process proceeds to S8. This S7 corresponds to a step to remove items that do not fit in a page from the page data and store the removed data as item laid out in the next page.

In S8, if the page data generating unit 10 determines there is item related to removed item of reserved job or scanning guidance in screen page currently displayed (Y in S8), the process proceeds to S9. If not (N in S8), this process is finished. This S8 corresponds to a step to determine whether or not there is item related to the removed item.

The page data generating unit 10 in FIG. 1 determines Y in the determining process described above if the removed item is reserved job and scanning guidance related to the reserved job is registered in display item list. Also, if the page data generating unit 10 determines that removed item is reserved job and scanning guidance related to the reserved job is not registered in the display item list, the page data generating unit 10 only updates the page data in S7 and finishes this process. Accordingly, error guidance is added and reserved job that does not fit in the page due to the addition is removed from the job list screen displayed on the displaying unit of the control panel 3 by the display controlling unit 12 in FIG. 1.

In S9, the page data generating unit 10 in FIG. 1 removes data for item related to data for item of reserved job or scanning guidance removed from page data of screen currently displayed, and stores the removed data as item to be laid out in the next page inside the page data generating unit 10, then this process is finished. This S9 corresponds to a step to delete item preliminarily related to removed item from page data, to store the item as item to be laid out in the next page, and to update page data of screen currently displayed.

The page data generating unit 10 in FIG. 1 removes a plurality of items from the page data of screen currently displayed in the process described above. Accordingly, the display controlling unit 12 in FIG. 1 displays job list screen on the displaying unit of the control panel 3 after removing reserved job and scanning guidance related to the reserved job that does not fit in the page by adding error guidance. Thus, the display controlling unit 12 in FIG. 1 executes display controlling process that displays screen on the displaying unit of the control panel 3 based on page data generated as shown in FIG. 2.

Figure 3:
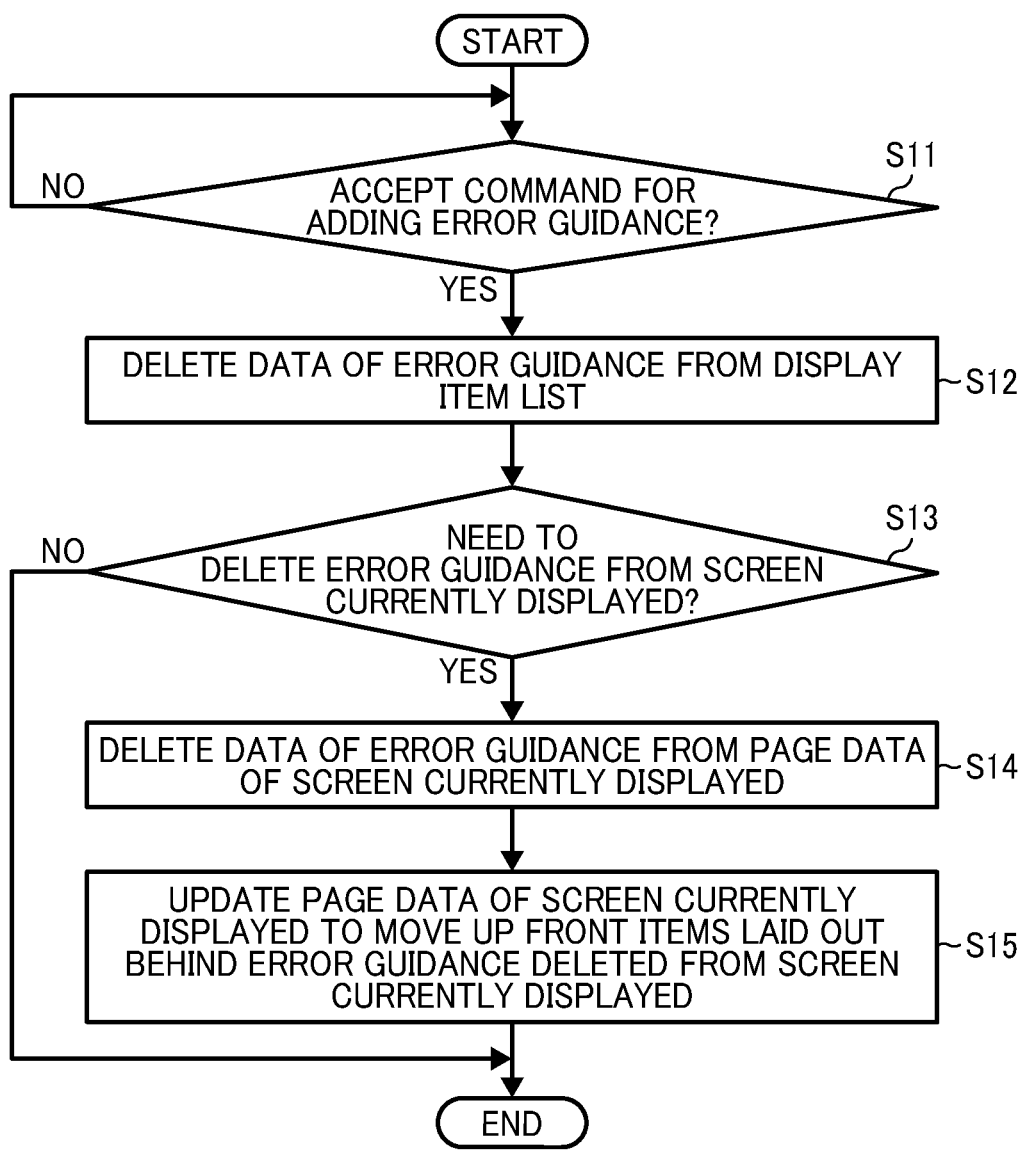
FIG. 3 is a flowchart illustrating an example of a display controlling process for a job list screen at the time of resolving an error by an control panel controller in the image forming apparatus in FIG. 1 as an embodiment of the present invention.

FIG. 3 is a flowchart illustrating an example of a display controlling process for job list screen at the time of resolving error by the control panel controller 9 in the image forming apparatus 1 in FIG. 1. If the control panel controller 9 is configured to execute the second controlling process described above, the control panel controller 9 displays job list screen on the displaying unit of the control panel 3 executing the process of the flowchart shown in FIG. 2, and executes process shown in FIG. 3.

In S11 in FIG. 3, if the control panel controller 9 in FIG. 1 determines that the deleting command accepting unit 15 accepts command to delete error guidance from the job controlling unit 6 (Y in S11), the process proceeds to S12. If not (N in S11), the S11 process is repeated. This S11 corresponds to a step to accept deleting command.

In S12, the item deleting unit 16 in FIG. 1 deletes data for error guidance from display item list of job list screen in the display item list storing unit 11, and the process proceeds to S13. This S12 corresponds to a step to delete item.

In S13, if the page data generating unit 10 in FIG. 1 determines that it is necessary to delete error guidance from screen currently displayed (on the displaying unit of the control panel 3) (Y in S13), the process proceeds to S14. If not (N in S13), this process is finished.

Whether or not it is necessary to delete error guidance can be determined as it is necessary to delete error guidance if error guidance is displayed in page of job list screen currently displayed. This S13 corresponds to a step to determine that it is necessary to delete item from screen currently displayed.

In S14, the page data generating unit 10 in FIG. 1 deletes error guidance data from page data of screen currently displayed (on the displaying unit of the control panel 3), and the process proceeds to S15. This S14 corresponds to a step to delete data that indicates item deleted from page data of screen currently displayed.

In S15, the page data generating unit 10 in FIG. 1 updates page data of screen currently displayed so that the page data generating unit 10 moves up front items behind the deleted error guidance in the screen currently displayed, and this process is finished. This S15 corresponds to a step to update page data of screen currently displayed by moving up front items behind the deleted error guidance in screen currently displayed.

Figure 4:
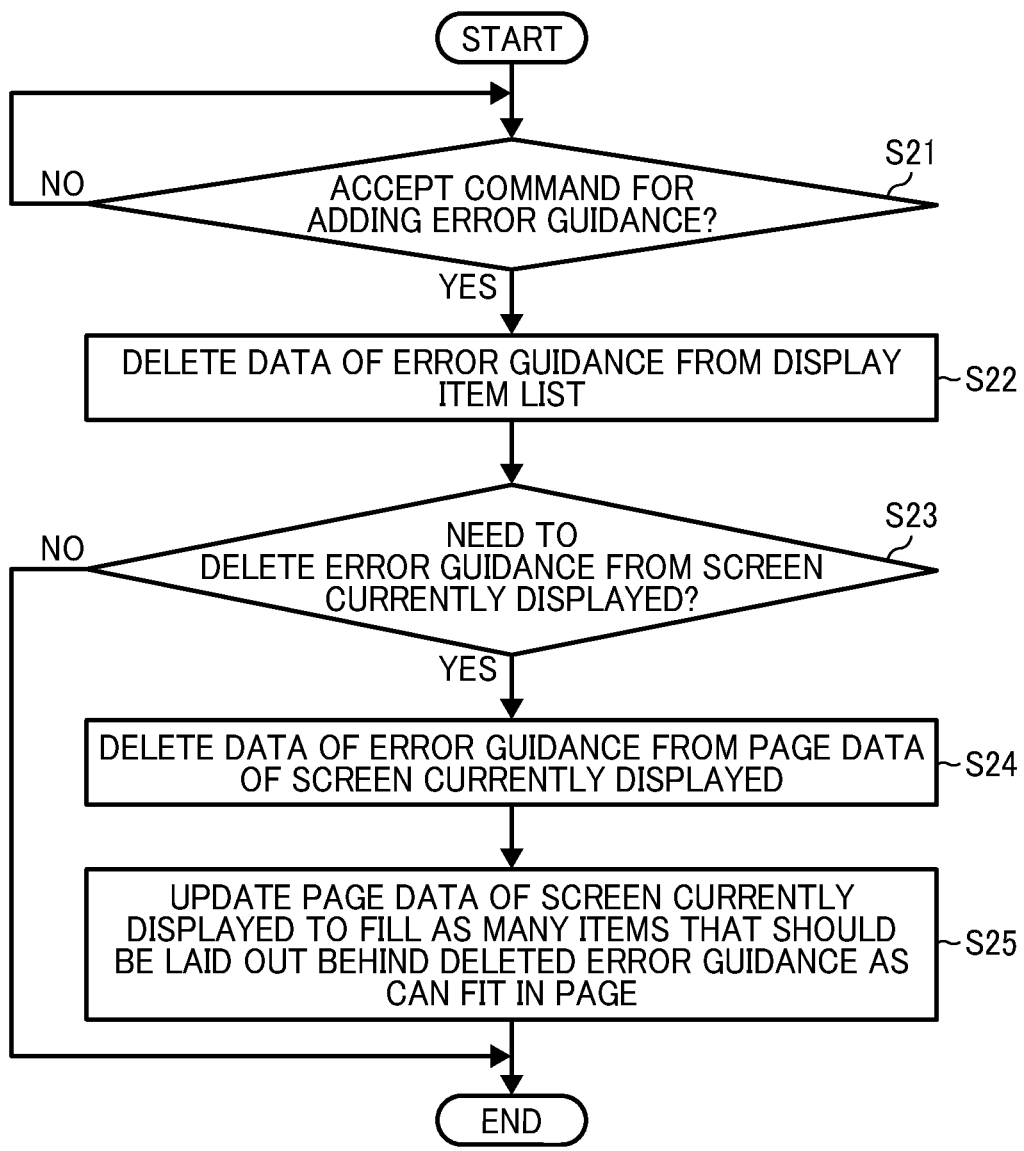
FIG. 4 is a flowchart illustrating another example of a display controlling process for a job list screen at the time of resolving an error by an control panel controller in the image forming apparatus in FIG. 1 as an embodiment of the present invention.

FIG. 4 is a flowchart illustrating another example of a display controlling process for a job list screen at the time of resolving error by the control panel controller 9 in the image forming apparatus 1 in FIG. 1. If the control panel controller 9 is configured to execute the third controlling process described above, the control panel controller 9 displays job list screen on the displaying unit of the control panel 3 executing the process of the flowchart shown in FIG. 2, and executes the process shown in FIG. 4.

In S21 in FIG. 4, if the control panel controller 9 in FIG. 1 determines that the deleting command accepting unit 15 accepts command to delete error guidance from the job controlling unit 6 (Y in S21), the process proceeds to S22. If not (N in S21), the S21 process is repeated. This S21 corresponds to a step to accept deleting command.

In S22, the item deleting unit 16 in FIG. 1 deletes data for error guidance from display item list of job list screen in the display item list storing unit 11, and the process proceeds to S23. This S22 corresponds to a step to delete item.

In S23, if the page data generating unit 10 in FIG. 1 determines that it is necessary to delete error guidance from screen currently displayed (on the displaying unit of the control panel 3) (Y in S23), the process proceeds to S24. If not (N in S23), this process is finished.

Whether or not it is necessary to delete error guidance can be determined as it is necessary to delete error guidance if error guidance is displayed in page of job list screen currently displayed. This S23 corresponds to a step to determine that it is necessary to delete item from screen currently displayed.

In S24, the page data generating unit 10 in FIG. 1 deletes error guidance data from page data of screen currently displayed (on the displaying unit of the control panel 3), and the process proceeds to S25. This S24 corresponds to a step to delete data that indicates item deleted from page data of screen currently displayed.

In S25, the page data generating unit 10 in FIG. 1 updates page data of screen currently displayed so that the page data generating unit 10 refers to display item list in the display item list storing unit 11 and lays out items behind the deleted error guidance in the screen currently displayed to fit in a page, and this process is finished. This S25 corresponds to a step to update page data of screen currently displayed by laying out items behind the deleted error guidance in screen currently displayed to fit in a page.

Figure 5:
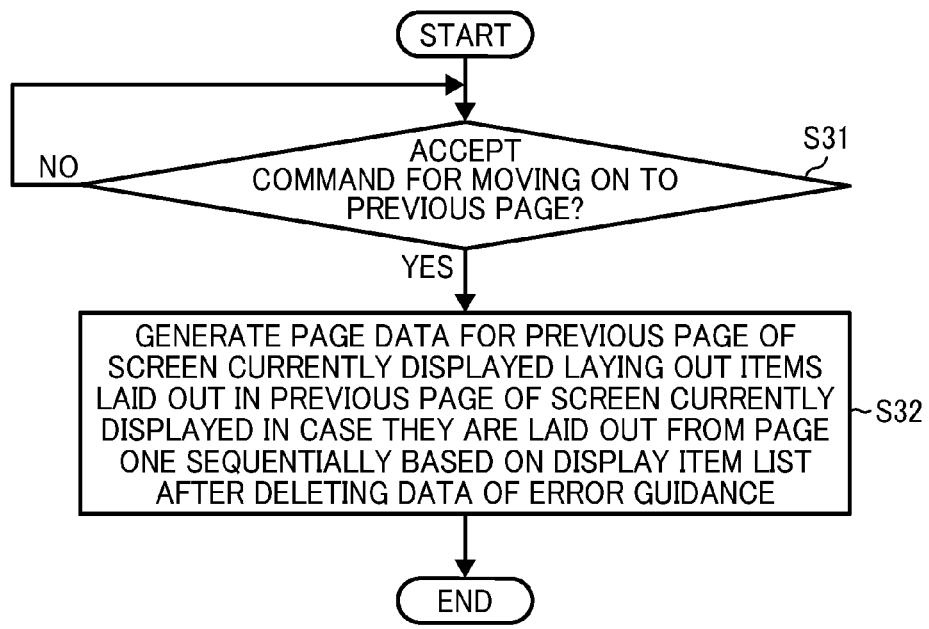
FIG. 5 is a flowchart illustrating an example of a display controlling process in case of receiving a command to move on to previous page in a job list screen at the time of resolving an error by an control panel controller in the image forming apparatus in FIG. 1.

FIG. 5 is a flowchart illustrating an example of a display controlling process in case of receiving command to move on to previous page in job list screen at the time of resolving error by the control panel controller 9 in the image forming apparatus 1 in FIG. 1. If the control panel controller 9 is configured to execute the fourth controlling process described above, the control panel controller 9 updates page data executing the process of the flowchart shown in FIG. 3 or FIG. 4 in response to deleting error guidance from display item list of job list screen, and executes process shown in FIG. 5.

In S31 in FIG. 5, after updating page data in response to deleting item from the display item list, if the control panel controller 9 in FIG. 1 determines that the moving command accepting unit 17 accepts command to move on to the previous page from the operation panel of the control panel 3 (Y in S31), the process proceeds to S32. If not (N in S31), the S31 process is repeated. This S31 corresponds to a step to accept moving command.

In S32, the page data generating unit 10 in FIG. 1 generates the previous page data that lays out items laid out in the previous page in case items are laid out from page one sequentially based on display item list after deleting error guidance data, and finishes this process. This S32 corresponds to a step to generate the previous page data that lays out items laid out in the previous page in case items are laid out from page one sequentially based on display item list after deleting item if the page data generating unit 10 accepts command to move on to the previous page after updating page data in response to deleting the item from display item list.

Figure 6:
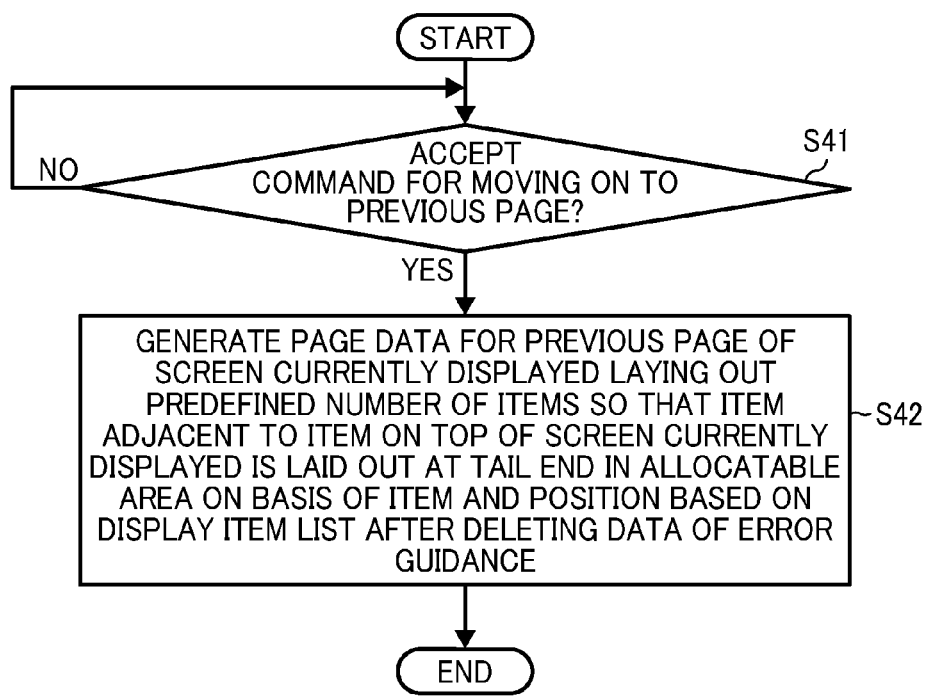
FIG. 6 is a flowchart illustrating another example of a display controlling process in case of receiving a command to move on to a previous page in a job list screen at the time of resolving an error by an control panel controller in the image forming apparatus in FIG. 1.

FIG. 6 is a flowchart illustrating another example of a display controlling process in case of receiving command to move on to previous page in job list screen at the time of resolving error by the control panel controller 9 in the image forming apparatus 1 in FIG. 1. If the control panel controller 9 is configured to execute the fifth controlling process described above, the control panel controller 9 updates page data executing the process of the flowchart shown in FIG. 3 or FIG. 4 in response to deleting error guidance from display item list of job list screen, and executes process shown in FIG. 6.

In S41 in FIG. 6, after updating page data in response to deleting item from the display item list, if the control panel controller 9 in FIG. 1 determines that the moving command accepting unit 17 accepts command to move on to the previous page from the operation panel of the control panel 3 (Y in S41), the process proceeds to S42. If not (N in S41), the S41 process is repeated. This S41 corresponds to a step to accept moving command.

In S42, the page data generating unit 10 in FIG. 1 generates the previous page data that lays out predefined number of items in a page based on display item list after deleting error guidance data so that item adjacent to item laid out on the top in screen currently displayed is laid out at the tail end of allocatable position, and finishes this process. This S42 corresponds to a step to generate the previous page data that lays out predefined number of items in a page based on display item list after deleting error guidance data so that item adjacent to item laid out on the top in screen currently displayed is laid out at the tail end of allocatable position after deleting item if the page data generating unit 10 accepts command to move on to the previous page after updating page data in response to deleting the item from display item list.

Figure 7:
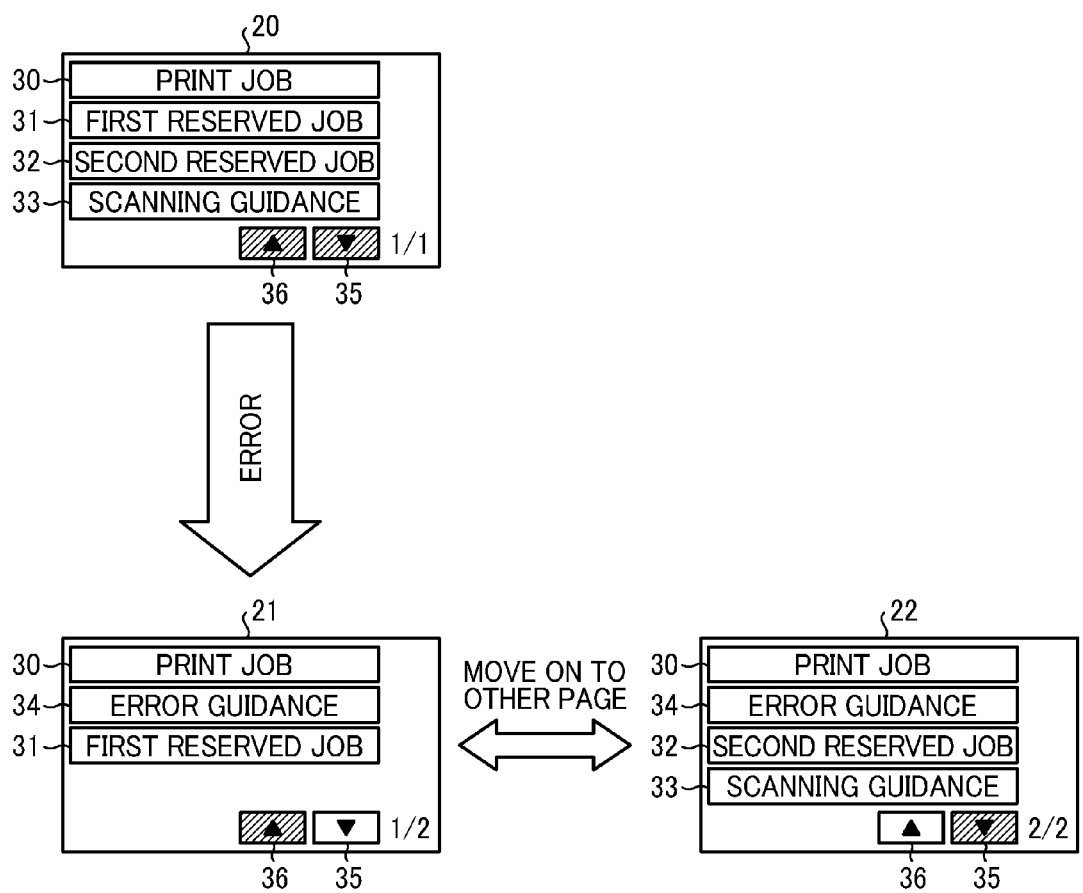
FIG. 7 is a diagram illustrating an example of a screen transition at the time of an error occurring during a display of a job list screen and moving to another page on a displaying unit of the control panel in FIG. 1 as an embodiment of the present invention.

Next, an example of displaying a job list screen on the displaying unit of the control panel 3 in the image forming apparatus 1 is described. First, a screen at the time an error occurs during displaying a job list screen is described. FIG. 7 is a diagram illustrating an example of screen transition at the time an error occurs during displaying a job list screen and moving to another page on the displaying unit of the control panel 3 in FIG. 1. In this screen transition, process described by the flowchart in FIG. 2 is executed. A job list screen 20 in FIG. 7 is an example of an initial job list screen.

In displaying the job list screen 20 in FIG. 7, the page data generating unit 10 in FIG. 1 generates page data that lays out a title of a print job on the top of the screen and a first reserved job, a second reserved job, and scanning guidance sequentially below the title of the print job, and moving to next page key, moving to previous page key, and number of pages based on display item list that registers the title of the print job, the first reserved job, the second reserved job, and scanning guidance and configuration that specifies that the number of items laid out in a page is four.

The job list screen 20 in FIG. 7 is an example of a screen that lays out a print job title 30, a first reserved job 31, a second reserved job 32, and scanning guidance 33 sequentially from the top of the screen. The print job title 30 indicates that this job list screen is a list of reserved print jobs, and is located at the top of the screen in this embodiment. Also, the first reserved job 31 indicates that its reservation order is the first, and the second reserved job 32 indicates that its reservation order is the second. The first reserved job 31 and the second reserved job 32 are laid out below the print job title 30 in reservation order sequentially.

For example, if the control panel controller 9 in FIG. 1 accepts a command to select the first reserved job 31 by a user operation via touch panel, information related to the first reserved job 31 (e.g. print settings) can be displayed. Furthermore, the scanning guidance 33 is related to the second reserved job 32 and is laid out below the second reserved job 32 in this embodiment. For example, if the control panel controller 9 in FIG. 1 accepts a command to select the scanning guidance 33 by a user operation via touch panel, explanations such as scanning condition of documents can be displayed in case the second reserved job is a copy printing job.

Also, the next page key and the previous page key are displayed at the bottom of the job list screens 20 and 21 in FIG. 7. In the job list screen 20 in FIG. 7, number of pages "1/1" is displayed since this screen is the first page in one page, and the next page key 35 and the previous page key 36 are reversing displayed to indicate that inputs to those keys are invalid. (Slant lines are drawn inside the next page key 35 and the previous page key 36 in FIG. 7.)

Next, if an error occurs during displaying the job list screen 20 in FIG. 7, the screen transitions to the job list screen 21 in FIG. 7. In displaying the job list screen 21 in FIG. 7, after accepting command to add error guidance from the job controlling unit 6, the page data generating unit 10 in FIG. 1 updates page data of the screen by adding item of error guidance to display item list of job list screen, determining that it is necessary to display the error guidance in this screen, and adding error guidance data to the page data of the screen.

Error guidance is laid out next order to print job title in this embodiment. As a result of adding the error guidance, the scanning guidance does not fit in this screen and the scanning guidance is related to the second reserved job, so the page data of screen currently displayed is updated by deleting the second reserved job and the scanning guidance from the current screen and storing the second reserved job and the scanning guidance as items laid out in the next page. In the job list screen 21 in FIG. 7, a print job title 30, error guidance 34, and a first reserved job 31 are displayed sequentially, and space below them remains blank.

The error guidance 34 displays messages such as content of error occurred in the image forming apparatus 1 and coping method with the error. For example, if the control panel controller 9 in FIG. 1 accepts a command to select the error guidance 34 by a user operation via touch panel, messages described above are displayed. In the job list screen 21 in FIG. 7, number of pages "1/2" is displayed since number of pages increased due to moving the second reserved job and the scanning guidance to the next page, and reversing display of the next page key 35 is canceled and the next page key 35 is displayed to indicate that input on the next page key 35 from a user is valid.

Next, if input to the next page key 35 is accepted during displaying the job list screen 21 in FIG. 7, the screen transitions to the job list screen 22 in FIG. 7. In displaying the job list screen 22 in FIG. 7, the page data generating unit 10 in FIG. 1 generates page data of the screen by laying out the print job title, the error guidance, the stored second reserved job, and the stored scanning guidance sequentially from the top of the screen.

In the job list screen 22 in FIG. 7, the print job title 30, error guidance 34, the second reserved job 32, and the scanning guidance 33 are displayed sequentially. Also, in the job list screen 22 in FIG. 7, number of pages "2/2" is displayed since number of pages increased due to moving the second reserved job and the scanning guidance to the next page, and the next page key 35 is reversing displayed again, reversing display of the previous page key 36 is canceled, and the previous page key 36 is displayed to indicate that input on the previous page key 36 from a user is valid. Furthermore, if command on the moving to the previous key 36 is accepted during displaying the job list screen 22 in FIG. 7, the screen goes back to the job list screen 21 in FIG. 7.

In this manner, if an error occurs during browsing a job list screen, error guidance is additionally displayed in page and notified to a user regardless of displaying any page. Also, reserved job that does not fit in the page due to additional displaying of error guidance can be displayed in the next page, and if scanning guidance related to the reserved job is moved to the next page due to additional displaying of error guidance, the related reserved job can also be displayed in the next page. Accordingly, a plurality of related items are not displayed being divided into different pages, and that can enhance the convenience of a user when the user refers to job list screen since a plurality of items related by the user can always be referred to in the same page.

Figure 8:
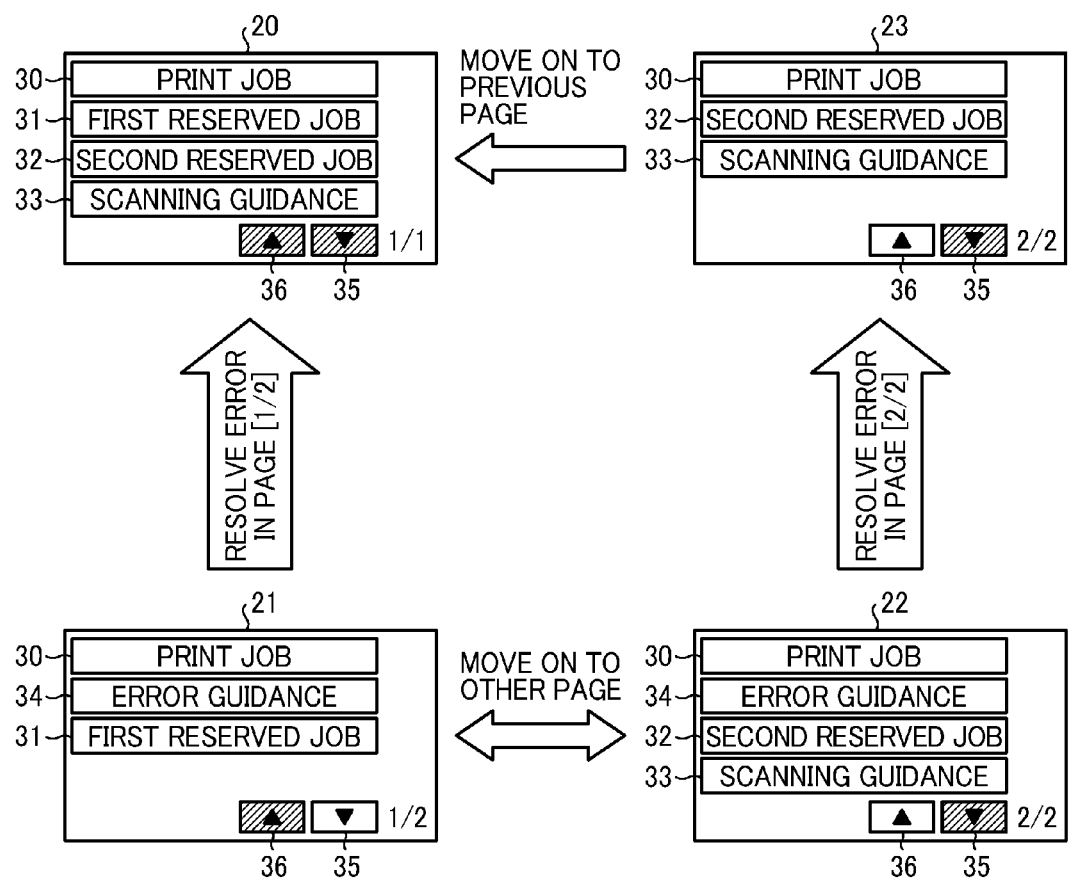
FIG. 8 is a diagram illustrating an example of screen transitions at the time of resolving an error and moving to another page on the job list screen in FIG. 7 as an embodiment of the present invention.

Next, screen transitions of job list screens at the time of resolving an error after the error occurred and moving to another page. FIG. 8 is a diagram illustrating an example of screen transitions at the time of resolving an error and moving to another page on the job list screen in FIG. 7. In FIG. 8, the same reference numerals are assigned to the same items as FIG. 7 and redundant explanations are omitted. If the error is resolved during displaying the job list screen 21 in FIG. 8, the screen goes back to the job list screen 20 as the initial screen in FIG. 8. In this screen transition, the process described by the flowchart in FIG. 4 is executed.

In displaying the job list screen 20 in FIG. 8, after accepting command to delete error guidance from the job controlling unit 6, the page data generating unit 10 in FIG. 1 updates page data of the screen by deleting item of the error guidance from display item list of the job list screen, laying out items that should be laid out behind the deleted item filled to fit in one page, laying out the first reserved job, the second reserved job, and scanning guidance sequentially.

Next, if an error is resolved during displaying the job list screen 22 in FIG. 8, the screen transitions to the job list screen 23 in FIG. 8. In this screen transition, process described by the flowchart in FIG. 3 is executed. In displaying the job list screen 23 in FIG. 8, after accepting command to delete the error guidance from the job controlling unit 6, the page data generating unit 10 in FIG. 1 updates page data of the screen by deleting item of the error guidance from the display item list of the job list screen.

Subsequently, the page data generating unit 10 in FIG. 1 updates the page data of the screen by moving up front items laid out behind the deleted error guidance in the display item list and laying out the second reserved job and scanning guidance sequentially. In a job list screen 23 in FIG. 8, the print job title 30, the second reserved job 32, and the scanning guidance 33 are displayed sequentially, and the space below them is left blank. Also, in the job list screen 23 in FIG. 8, the next page key 35 is reversing displayed again (slant lines are drawn inside the next page key 35), reversing display of the previous page key 36 is canceled, and the previous page key 36 is displayed to indicate that input on the previous page key 36 from a user is valid.

Next, if input to the previous page key 36 is accepted during displaying the job list screen 23 in FIG. 8, the screen transitions to the job list screen 20 as the initial screen in FIG. 8. In this screen transition, process described by the flowchart in FIG. 5 is executed. In going back to displaying the job list screen 20 in FIG. 8, the page data generating unit 10 in FIG. 1 generates page data that lays out items that should be laid out in the previous page of the page currently displayed in case items are laid out from page one, i.e. a title of a print job, a first reserved job, a second reserved job, and scanning guidance sequentially based on display item list that after deleting data of the error guidance.

In this manner, even if an error is resolved and error guidance is deleted during browsing a job list screen, items in the page currently displayed do not move to other pages (the second reserved job 32 and the scanning guidance 33 in FIG. 8). Accordingly, a user do not have to be forced complicated operations such as searching for items to which the user refereed, and that can enhance the convenience of the user when the user refers to job list screen.

Figure 9:
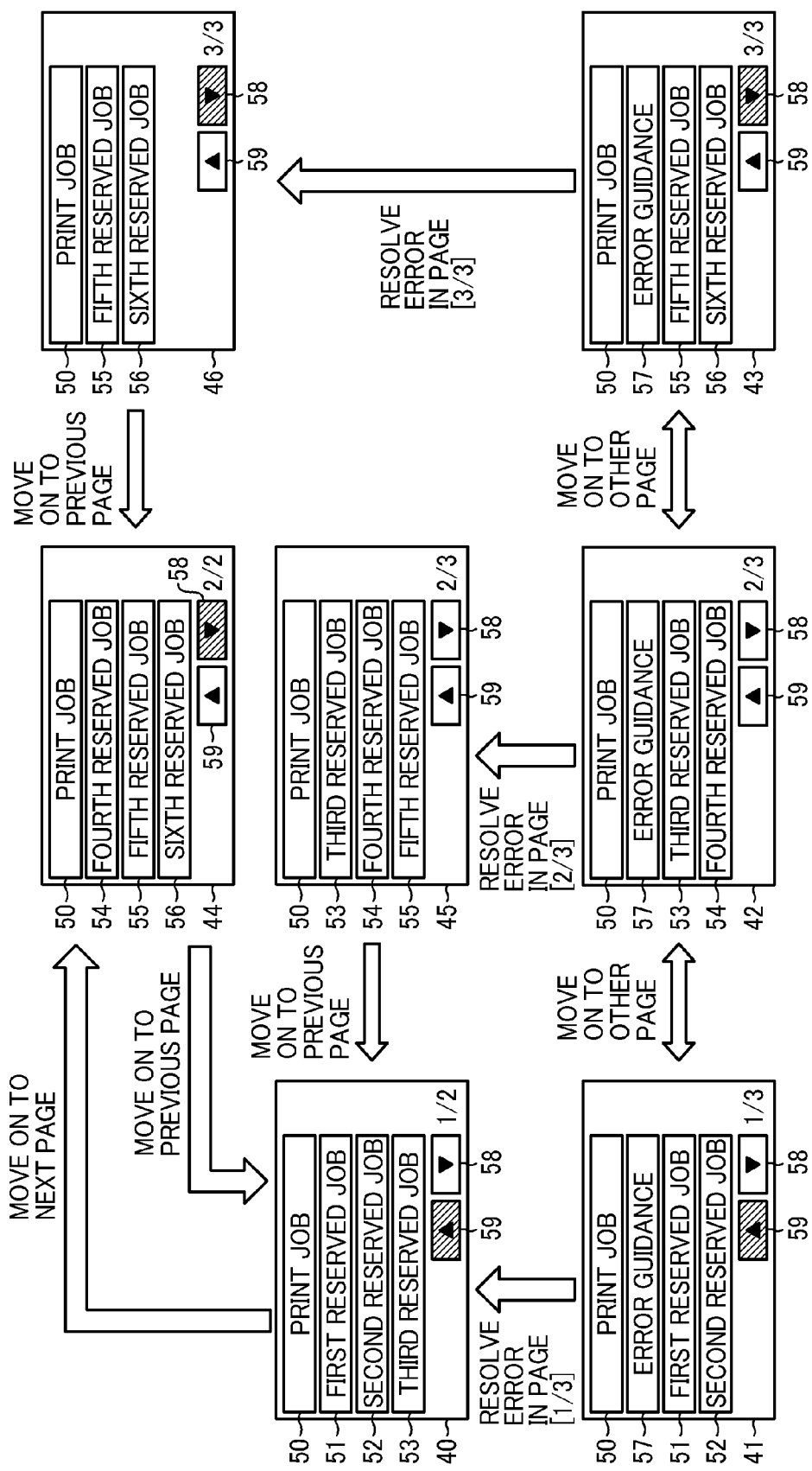
FIG. 9 is a diagram illustrating another example of an error occurring, resolving the error, and moving to another page on the job list screen on a displaying unit of the control panel in FIG. 1 as an embodiment of the present invention.

Next, another example of displaying a job list screen on the displaying unit in the control panel 3 in the image forming apparatus 1 is described. FIG. 9 is a diagram illustrating another example of screen transitions at the time of an error occurring, resolving the error, and moving to another page on the job list screen on the displaying unit of the control panel 3 in FIG. 1

A job list screen 40 in FIG. 9 is an example of an initial screen of job list screens. In displaying the job list screen 40 in FIG. 9, the page data generating unit 10 in FIG. 1 generates page data that lays out a title of a print job on the top of the screen and a first reserved job, a second reserved job, a third reserved job, and scanning guidance sequentially below the title of the print job, and moving to next page key, moving to previous page key, and number of pages based on display item list that registers the title of the print job, from the first reserved job to the sixth reserved job, and scanning guidance and configuration that specifies that the number of items laid out in a page is four.

The job list screen 40 in FIG. 9 is an example of a screen that lays out a print job title 50, a first reserved job 51, a second reserved job 52, and a third reserved job 53 sequentially from the top of the screen. The print job title 50 indicates that this job list screen is a list of reserved print jobs, and is located at the top of the screen in this embodiment. Also, the first reserved job 51 indicates that its reservation order is the first, the second reserved job 52 indicates that its reservation order is the second, and the third reserved job 53 indicates that its reservation order is the third. The first reserved job 51, the second reserved job 52, and the third reserved job 53 are laid out below the print job title 50 in reservation order sequentially.

For example, if the control panel controller 9 in FIG. 1 accepts a command to select the first reserved job 51 by a user operation via the touch panel, information related to the first reserved job 51 (e.g. print settings) can be displayed. Also, the next page key and the previous page key are displayed at the bottom of the job list screens from 40 to 46 in FIG. 9. In the job list screen 40 in FIG. 9, number of pages "1/2" is displayed since this screen is the first page in two pages, and the previous page key 59 is reversing displayed to indicate that inputs to those keys are invalid. (Slant lines are drawn inside the previous page key 36 in FIG. 7) and the next page key 58 is displayed to indicate that input on the next page key 58 from a user is valid.

Next, if an error occurs during displaying the job list screen 20 in FIG. 7, the screen transitions to the job list screen 21 in FIG. 7. In this screen transition, process described by the flowchart in FIG. 2 is executed. In displaying the job list screen 41 in FIG. 9, after accepting command to add error guidance from the job controlling unit 6, the page data generating unit 10 in FIG. 1 updates page data of the screen by adding item of error guidance to display item list of job list screen, determining that it is necessary to display the error guidance in this screen, and adding error guidance data to the page data of the job list screen 40.

In this embodiment, the error guidance is located at next order of the print job title. After adding the error guidance, the third reserved job does not fit in this page, so the page data generating unit 10 updates page data of the screen currently displayed by deleting the third reserved job from this screen and storing it as item to be laid out in the next page.

In job list screen 41 in FIG. 9, a print job title 50, an error guidance 57, a first reserved job 51, and a second reserved job 52 are displayed sequentially. Also, in job list screen 42 in FIG. 9, number of pages "1/3" is displayed since number of pages increased by moving the third reserved job into next page.

Next, if input to the next page key 58 is accepted during displaying the job list screen 41 in FIG. 9, the screen transitions to the job list screen 42 in FIG. 9. In displaying the job list screen 42 in FIG. 9, the page data generating unit 10 in FIG. 1 generates page data of the screen by laying out the print job title, the error guidance, the stored third reserved job, and subsequent fourth reserved job sequentially from the top of the screen.

Since a fifth reserved job and a sixth reserved job do not fit into this screen by adding the error guidance and moving the third reserved job to this screen, the page data generating unit 10 updates page data of screen currently displayed by deleting the fifth reserved job and the sixth reserved job from this screen and storing them as items to be laid out in the next page.

In the job list screen 42 in FIG. 9, the print job title 50, the error guidance 57, the third reserved job 53, and the fourth reserved job 54 are displayed sequentially. Also, in the job list screen 42 in FIG. 9, number of pages "2/3" is displayed since number of pages increased due to moving the fifth reserved job and the sixth reserved job to the next page, and reversing display of the previous page key 59 is canceled and the previous page key 59 is displayed to indicate that input on the previous page key 59 from a user is valid. Furthermore, if command on the moving to the previous key 59 is accepted during displaying the job list screen 42 in FIG. 9, the screen goes back to the job list screen 41 in FIG. 9.

Next, if input to the next page key 58 is accepted during displaying the job list screen 42 in FIG. 9, the screen transitions to the job list screen 43 in FIG. 9. In displaying the job list screen 43 in FIG. 9, the page data generating unit 10 in FIG. 1 generates page data of the screen by laying out the print job title, the error guidance, the stored fifth reserved job, and the stored sixth reserved job sequentially from the top of the screen.

In the job list screen 43 in FIG. 9, the print job title 50, the error guidance 57, the fifth reserved job 55, and the sixth reserved job 56 are displayed sequentially. Also, in the job list screen 43 in FIG. 9, number of pages "3/3" is displayed, the next page key 58 is reversing displayed again (slant lines are drawn inside the next page key 58), reversing display of the previous page key 59 is canceled, and the previous page key 59 is displayed to indicate that input on the previous page key 59 from a user is valid. Furthermore, if command on the moving to the previous key 59 is accepted during displaying the job list screen 43 in FIG. 9, the screen goes back to the job list screen 42 in FIG. 9.

In this manner, if an error occurred during browsing a job list screen, error guidance is additionally displayed in the page currently displayed and a user can be notified. Also, reserved jobs that do not fit in the page due to additional displaying of error guidance can be displayed in the next page.

Next, if an error is resolved during displaying the job list screen 41 in FIG. 9, the screen transitions to the job list screen 40 as the initial screen in FIG. 9. In this screen transition, process described by the flowchart in FIG. 4 is executed. In displaying the job list screen 40 in FIG. 9, after accepting command to delete the error guidance from the job controlling unit 6, the page data generating unit 10 in FIG. 1 deletes item of the error guidance from display item list of the job list screen. Subsequently, the page data generating unit 10 in FIG. 1 updates page data of the screen by laying out the first reserved job, the second reserved job, and the third reserved job sequentially laying out items that should be laid out behind the deleted error guidance in the display item list as many as fitting into a page. Thus, the job list screen returns to the initial state.

Next, if an error is resolved during displaying the job list screen 42 in FIG. 9, the screen transitions to the job list screen 45 in FIG. 9. In this screen transition, process described by the flowchart in FIG. 4 is executed. In displaying the job list screen 45 in FIG. 9, after accepting command to delete the error guidance from the job controlling unit 6, the page data generating unit 10 in FIG. 1 deletes item of the error guidance from display item list of the job list screen. Subsequently, the page data generating unit 10 in FIG. 1 updates page data of the screen by laying out the third reserved job, the fourth reserved job, and the fifth reserved job sequentially laying out items that should be laid out behind the deleted error guidance in the display item list as many as fitting into a page. In the job list screen 45 in FIG. 9, the print job title 50, the third reserved job 53, the fourth reserved job 54, and the fifth reserved job 55 are displayed sequentially.

Next, if an error is resolved during displaying the job list screen 43 in FIG. 9, the screen transitions to the job list screen 46 in FIG. 9. In this screen transition, process described by the flowchart in FIG. 4 is executed. In displaying the job list screen 46 in FIG. 9, after accepting command to delete the error guidance from the job controlling unit 6, the page data generating unit 10 in FIG. 1 deletes item of the error guidance from display item list of the job list screen. Subsequently, the page data generating unit 10 in FIG. 1 updates page data of the screen by laying out the fifth reserved job and the sixth reserved job sequentially laying out items that should be laid out behind the deleted error guidance in the display item list as many as fitting into a page. In displaying the job list screen 46 in FIG. 9, the print job title 50, the fifth reserved job 55 and the sixth reserved job 56 are displayed sequentially, and the space below them is left blank.

Next, if input to the previous page key 59 is accepted during displaying the job list screen 45 in FIG. 9, the screen returns to the job list screen 40 as the initial screen in FIG. 9. In this screen transition, process described by the flowchart in FIG. 5 is executed. In returning to displaying the job list screen 40 in FIG. 9, the page data generating unit 10 in FIG. 1 generates page data that lays out items that should be laid out in the previous page of the page currently displayed in case items are laid out from page one, i.e. a title of a print job, a first reserved job, a second reserved job, and the third reserved job sequentially based on display item list that after deleting data of the error guidance.

While not shown in FIG. 9, it should be noted that the screen transitions to the next page if input to the next page key 58 is accepted during displaying the job list screen 45 in FIG. 9. In that page, the print job title and the sixth reserved job are displayed sequentially.

Next, if input to the previous page key 59 is accepted during displaying the job list screen 46 in FIG. 9, the screen transitions to the job list screen 44 in FIG. 9. In this screen transition, process described by the flowchart in FIG. 5 is executed. In displaying the job list screen 44 in FIG. 9, the page data generating unit 10 in FIG. 1 generates page data that lays out items that should be laid out in page two as previous page of the page three currently displayed in case items are laid out from page one, i.e. a print job title, a fourth reserved job, a fifth reserved job, and the sixth reserved job sequentially based on display item list that after deleting data of the error guidance. In displaying the job list screen 44 in FIG. 9, the print job title 50, the fourth reserved job 54, the fifth reserved job 55 and the sixth reserved job 56 are displayed sequentially. Furthermore, in displaying the job list screen 44 in FIG. 9, number of pages "2/2" is displayed since total number of pages return to two due to transition to the job list screen 44 in FIG. 9, and the next page key 58 is reversing displayed (slant lines are drawn inside the next page key 58 in FIG. 9).

In this manner, even if an error is resolved and error guidance is deleted during displaying a job list screen, items in the page currently displayed do not move to other pages. Accordingly, a user does not have to be forced complicated operations such as searching for items to which the user refereed. Also, items including reserved jobs displayed before moving can be displayed in case of moving to previous page from page after deleting error guidance, and that can enhance the convenience of the user who wants to refer to list in previous page including reserved job displayed before moving.

Next, if input to the previous page key 59 is accepted during displaying the job list screen 44 in FIG. 9, the screen returns to the job list screen 40 as the initial screen in FIG. 9. In this screen transition, process described by the flowchart in FIG. 5 is executed. In returning to displaying the job list screen 40 in FIG. 9, the page data generating unit 10 in FIG. 1 generates page data that lays out items that should be laid out in page one as previous page of the page two currently displayed in case items are laid out from page one, i.e. a print job title, a first reserved job, a second reserved job, and the third reserved job sequentially based on display item list that after deleting data of the error guidance.

Next, yet another example of displaying a job list screen on the displaying unit in the control panel 3 in the image forming apparatus 1 is described. While case that items including the fifth reserved job 55 and the sixth reserved job 56 displayed in the job list screen 46 in FIG. 9 are displayed in the job list screen 44 in FIG. 9 as the previous page of the job list screen 46 in FIG. 9 is described above, screen that does not include the fifth reserved job 55 and the sixth reserved job 56 can be displayed by executing process illustrated by the flowchart in FIG. 6.

Figure 10:
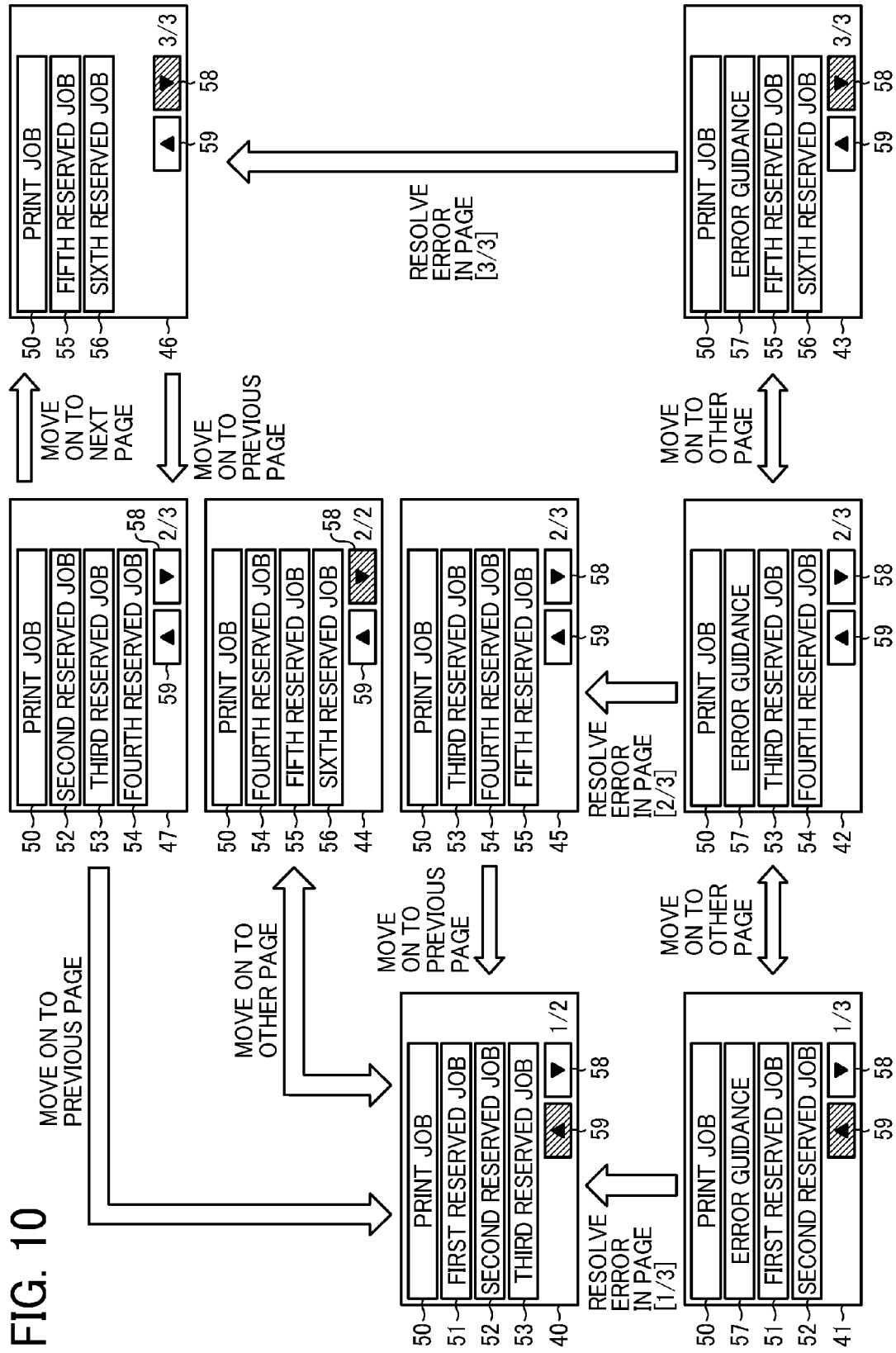
FIG. 10 is a diagram illustrating yet another example of an error occurring, resolving the error, and moving to another page on the job list screen on a displaying unit of the control panel in FIG. 1 as an embodiment of the present invention.

FIG. 10 is a diagram illustrating yet another example of an error occurring, resolving the error, and moving to another page on the job list screen on displaying unit of the control panel 3 in FIG. 1. In FIG. 10, the same reference numerals are assigned to the same items as FIG. 9 and redundant explanations are omitted. Screen transitions to the job list screen 47 in FIG. 10 if input to the previous page key 59 is accepted during displaying the job list screen 46 in FIG. 10.

In this screen transition, process described by the flowchart in FIG. 6 is executed. In displaying the job list screen 47 in FIG. 10, the page data generating unit 10 in FIG. 1 generates page data that lays out the print job title, the second reserved job, the third reserved job, and the fourth reserved job as page data of page two as previous page of page three currently displayed by laying out four items predefined number of items in a page based on the display item list after deleting data of the error guidance so that item of the fourth reserved job adjacent item of the fifth reserved job displayed at the top of screen currently displayed is located at the tail end in allocatable area.

In the job list screen 47 in FIG. 9, the print job title 50, the second reserved job 52, the third reserved job 53, and the fourth reserved job 54 are displayed sequentially. Furthermore, number of pages "2/3" is displayed due to transition to the job list screen 47 in FIG. 10, and reversing display of the next page key 58 is canceled. Also, if input to the previous page key 59 is accepted during displaying the job list screen 47 in FIG. 10, the screen transitions to the job list screen 40 as the initial screen in FIG. 10. Moreover, if input to the next page key 58 is accepted during displaying the job list screen 47 in FIG. 10, the screen returns to the job list screen 46 in FIG. 10.

In this manner, even if an error is resolved and error guidance is deleted during browsing a job list screen, items in the page currently displayed do not move to other pages. Accordingly, a user does not have to be forced complicated operations such as searching for items to which the user referered. Also, items including reserved jobs displayed before moving can be undisplayed in case of moving to previous page from page after deleting error guidance, and that can enhance the convenience of the user who wants to refer to list in previous page not including reserved job displayed before moving.

Figure 11A:
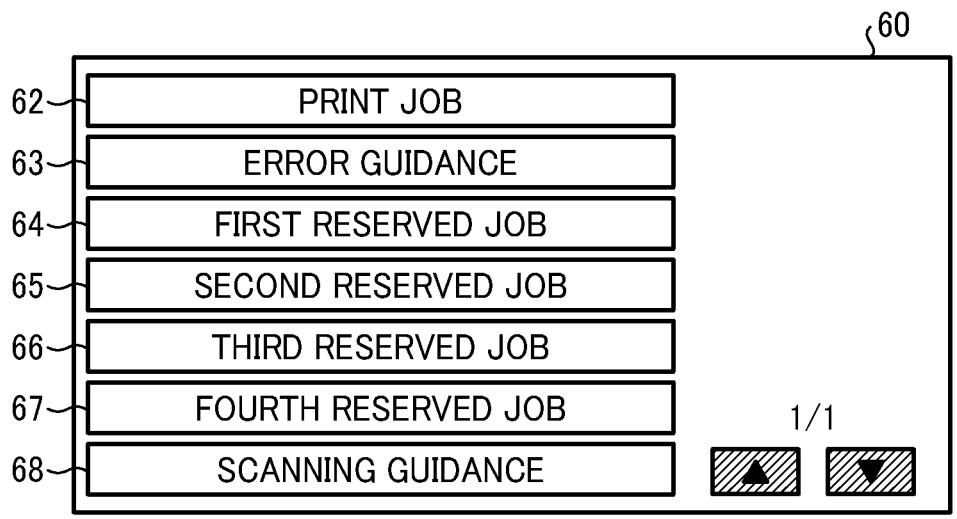
FIG. 11A and FIG. 11B are diagrams illustrating examples of a job list screen as an embodiment of the present invention.
Figure 11B:
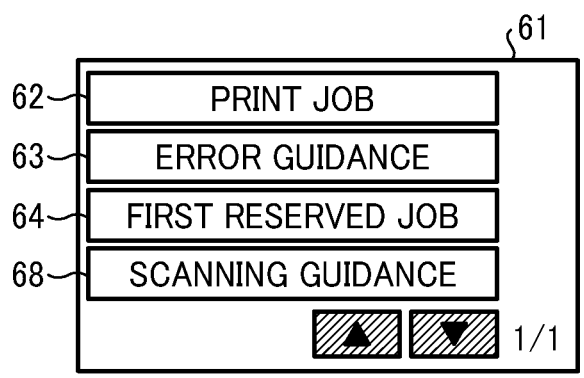

Next, a reference example of job list screen is described below. FIG. 11A and FIG. 11B are diagrams illustrating examples of a job list screen. In a job list screen 60 in FIG. 11A, display position of an error guidance 63 is fixed under a print job title 62, and display position of a scanning guidance 68 is fixed at the bottom of the screen. Reserved jobs are located between the error guidance 63 and the scanning guidance 68. In the job list screen 60, a first reserved job 64, a second reserved job 65, a third reserved job 66, and the fourth reserved job 67 are displayed.

In this kind of job list screen, display area of screen cannot be used efficiently since area to display the error guidance 63 and the scanning guidance 68 is always cordoned off even if it is not necessary to display the error guidance 63 and the scanning guidance 68. Also, in a job list screen 61 in FIG. 11B, only a first reserved job 64 can be displayed in a page since its display area is smaller than the job list screen 60. That is, number of reserved jobs listed in a page gets lesser in case display area is small, so a user needs to do more flipping operations if the user wants to browse many reserved jobs and that makes the user feel inconvenient. Also, if character size becomes smaller, it is difficult to browse job list.

To cope with these issues, in the image forming apparatus 1 of this embodiment, priority is given to display reserved jobs in job list screen, and error guidance is displayed by inserting in reserved job list when an error occurs, so more reserved job items can be displayed under normal conditions.

It should be noted that while a case in which items are displayed vertically in job list screen is described in the embodiment above, items can also be displayed horizontally or in a matrix array. Also, while an example of displaying a job list screen is described in the embodiment above, displaying list of other items can be implemented in the same way as described above, e.g. displaying list of executed job history. Moreover, in not only image forming apparatuses but also general image processing apparatuses, displaying list of various items can be implemented in the same way as described above.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An image forming apparatus, comprising:
a control panel including a display screen;
memory storing computer-readable instructions;
one or more processors configured to execute the computer-readable instructions such that the one or more processors are configured to perform operations including,
    displaying information on the display screen;
    storing a display item list that indicates items to be displayed on the display screen, the items to be displayed on the display screen including at least one of a print job, a reserved job, error guidance, or scanning guidance;
    generating page data that specifies, based on the display item list, two or more items to be displayed on one or more pages and a layout order of the two or more items;
    displaying a first page on the display screen based on the generated page data such that the two or more items are displayed on the first page, the first page being a page of the display screen;
    receiving an additional request for at least one additional item to be displayed on the display screen;
    adding the at least one additional item to the display item list; and
    updating the page data based on the at least one additional item,
    based on the updated page data,
        displaying the at least one additional item on the first page,
        selecting at least a first selected item to be moved from the displayed first page to a second page, the first selected item being one of the displayed two or more items that no longer fits on the displayed first page as a result of the addition of the at least one additional item to the displayed first page, the second page being a page of the display screen, the second page being a page to be displayed by the one or more processors on the display screen subsequently to the displayed first page, and
        when the displayed two or more first items includes a related item, moving both the first selected item and the related item from the displayed first page to the second page, the related item being one of the displayed two or more items that fits on the displayed first page even after the at least one additional item is added to the displayed first page, the related item being related to the first selected item.

2. The display controlling apparatus according to claim 1,
wherein the one or more processors are configured to
execute the computer-readable instructions such that the
one or more processors are configured to,
    accept a command to delete at least one specified item to be displayed on the display screen; and
    delete, from the display item list, the at least one specified item,
    update page data of a page of the display screen currently displayed by the one or more processors on the display screen, and
wherein the one or more processors are configured to execute the computer-readable instructions such that, based on the updated page data of the currently displayed page, the one or more processors are configured to remove the at least one specified item from the currently displayed page, and move up positions of lower items with respect to a layout of the currently displayed page,
the lower items being items that were, before the removal of the at least one specified item from the first page,
    items displayed on the currently displayed page at positions lower than that of the at least one specified item or items to be displayed on a page of the display screen subsequent to the currently displayed page.

3. The display controlling apparatus according to claim 1,
wherein the one or more processors are configured to execute the computer-readable instructions such that the one or more processors are configured to,
    accept a command to delete at least one specified item to be displayed on the display screen; and
    delete, from the display item list, the at least one specified item,
wherein the one or more processors are configured to execute the computer-readable instructions such that the one or more processors are configured to update page data of a page of the display screen currently displayed by the one or more processors on the display screen, and
wherein the one or more processors are configured to execute the computer-readable instructions such that, based on the updated page data of the currently displayed page, the one or more processors are configured to remove the at least one specified item from the currently displayed page, and move up positions of lower items with respect to a layout of the currently displayed page such that the lower items fill the currently displayed page,
the lower items being items that were, before the removal of the at least one specified item from the first page,
    items displayed on the currently displayed page at positions lower than that of the at least one specified item or items to be displayed on a page subsequent to the currently displayed page.

4. The display controlling apparatus according to claim 2,
wherein the one or more processors are configured to execute the computer-readable instructions such that the one or more processors are configured to,
    perform a moving command accepting operation including accepting a command to move on to the previous page; and
    generate page data for the previous page of the display screen that lays out items laid out on the previous page in case items are laid out sequentially from the first page based on the display item list after deleting the at least one specified item if the moving command accepting operation accepts the command to move on to the previous page after updating the page data in response to deleting the at least one specified item from the display item list.

5. The display controlling apparatus according to claim 2,
wherein the one or more processors are configured to execute the computer-readable instructions such that the one or more processors are configured to,
    perform a moving command accepting operation including accepting a command to move on to the previous page of the display screen; and
    generate page data for the previous page that lays out predefined number of items based on display item list after deleting the at least one specified item so that an item adjacent to an item displayed at top on the screen currently displayed is laid out in the tail end of layout possible position if the moving command accepting operation accepts the command to move on to the previous page after updating the page data in response to deleting the at least one specified item from the display item list.

6. A image forming apparatus, comprising the display controlling apparatus according to claim 1.

7. A method of controlling display on a control panel of an image forming apparatus, the control panel including a display screen, the method comprising the steps of:
    displaying information on the display screen;
    storing a display item list that indicates items to be displayed on the display screen, the items to be displayed on the display screen including at least one of a print job, a reserved job, error guidance, or scanning guidance;
    generating page data that specifies, based on the display item list, two or more first items to be displayed on one or more pages and a layout order of the two or more items;
    displaying a first page on display screen based on the generated page data such that the two or more items are displayed on the first page, the first page being a page of the display screen;
    receiving an additional request for at least one additional item to be displayed;
    adding the at least one additional item to the display item list;
    updating the page data based on the at least one additional item; and
    based on the updated page data,
        displaying the at least one additional item on the first page,
        selecting at least a first selected item to be moved from the displayed first page to a second page, the first selected item being one of the displayed two or more items that no longer fits on the displayed first page as a result of the addition of the at least one additional item to the displayed first page, the second page being a page of the display screen, the second page being a page to be displayed subsequently to the displayed first page, and
        when the displayed two or more first items includes a related item, moving both the first selected item and the related item from the displayed first page to the second page, the related item being one of the displayed two or more items that fits on the displayed first page even after the at least one additional item is added, the related item being related to the first selected item.

8. The method of controlling display according to claim 7, further comprising the steps of:
- accepting a command to delete at least one specified item to be displayed;
- deleting, from the display item list, the at least one specified item;
- updating page data of a page of the display screen currently displayed; and
- based on the updated page data of the currently displayed page,
  - removing the at least one specified item from the currently displayed page, and moving positions of lower items up with respect to a layout of the currently displayed page,
- the lower items being items that were, before the removal of the at least one specified item from the first page,
  - items displayed on the currently displayed page at positions lower than that of the at least one specified item or items to be displayed on a page of the display screen subsequent to the currently displayed page.

9. The method of controlling display according to claim 7, further comprising the steps of:
- accepting a command to delete at least one specified item to be displayed;
- deleting, from the display item list, the at least one specified item;
- updating page data of a page of the display screen currently displayed; and
- based on the updated page data of the currently displayed page,
  - removing the at least one specified item from the currently displayed page, and moving positions of lower items up with respect to a layout of the currently displayed page such that the lower items fill the currently displayed page,
- the lower items being items that were, before the removal of the at least one specified item from the first page,
  - items displayed on the currently displayed page at positions lower than that of the at least one specified item or items to be displayed on a page of the display screen subsequent to the currently displayed page.

10. The method of controlling display according to claim 8, further comprising the steps of:
- accepting a command to move on to the previous page of the display screen; and
- generating page data for the previous page that lays out items laid out on the previous page in case items are laid out sequentially from the first page based on the display item list after deleting the at least one specified item if the command to move on to the previous page is accepted after updating the page data in response to deleting the at least one specified item from the display item list.

11. The method of controlling display according to claim 8, further comprising the steps of:
- accepting a command to move on to the previous page; and
- generating page data for the previous page that lays out predefined number of items based on a display item list after deleting at least one specified item so that an item adjacent to an item displayed at top on the screen currently displayed is laid out in the tail end of layout possible position if the command to move on to the previous page of the display screen is accepted after updating the page data in response to deleting the at least one specified item from the display item list.

12. A non-transitory computer-readable storage medium storing a program that, when executed by a computer, causes the computer to operations for displaying image data on a control panel of an image forming apparatus, the control panel including a display screen, the operations comprising:
- displaying information on the display screen;
- storing a display item list that indicates items to be displayed on the display screen, the items to be displayed on the display screen including at least one of a print job, a reserved job, error guidance, or scanning guidance;
- generating page data that specifies, based on the display item list, two or more first items to be displayed on one or more pages and a layout order of the two or more items;
- displaying a first page on the display screen based on the generated page data such that the two or more items are displayed on the first page, the first page being a page of the display screen;
- receiving an additional request for at least one additional item to be displayed;
- adding the at least one additional item to the display item list;
- updating the page data based on the at least one additional item; and
- based on the updated page data,
  - displaying the at least one additional item on the first page,
  - selecting at least a first selected item to be moved from the displayed first page to a second page, the first selected item being one of the displayed two or more items that no longer fits on the displayed first page as a result of the addition of the at least one additional item to the displayed first page, the second page being a page of the display screen, the second page being a page to be displayed subsequently to the displayed first page, and
  - when the displayed two or more first items includes a related item, moving both the first selected item and the related item from the displayed first page to the second page, the related item being one of the displayed two or more items that fits on the displayed first page even after the at least one additional item is added to the displayed first page, the related item being related to the first selected item.

13. The display controlling apparatus according to claim 1,
- wherein the at least one additional item whose additional request is received by the additional request receiving unit includes one or more error guidance messages,
- the one or more error guidance messages including at least one of a message indicating a content of an error that occurred in the display controlling apparatus and a message indicating a method of coping with the error that occurred in the display controlling apparatus, and
- wherein the display controlling unit is configured to control the displaying unit to display the one or more error guidance messages.

14. The display controlling apparatus according to claim 1, wherein the display controlling unit is configured such that,
- at least the first selected item is scanning guidance, and
- the related item is a reserved job when the scanning guidance is related to a reserved job on the display unit.

15. The method of claim 7,
- wherein the at least one additional item for which the additional request is received includes one or more error guidance messages,
- the one or more error guidance messages including at least one of a message indicating a content of an error that occurred in the step of displaying information and a message indicating a method of coping with the error that occurred in the step of displaying information, and wherein the displaying the at least one additional item on the first page includes displaying the one or more error guidance messages.

16. The method of claim 7, wherein, at least the first selected item is scanning guidance, and the related item is a reserved job when the scanning guidance is related to a reserved job being displayed on the first page.

17. The non-transitory computer-readable storage medium of claim 12, wherein the at least one additional item for which the additional request is received includes one or more error guidance messages, the one or more error guidance messages including at least one of a message indicating a content of an error that occurred in the step of displaying information and a message indicating a method of coping with the error that occurred in the step of displaying information, and wherein the displaying the at least one additional item on the first page includes displaying the one or more error guidance messages.

18. The non-transitory computer-readable storage medium of claim 12, wherein, at least the first selected item is scanning guidance, and the related item is a reserved job when the scanning guidance is related to a reserved job being displayed on the first page.

* * * * *